United States Patent
Lee et al.

(10) Patent No.: US 10,469,884 B2
(45) Date of Patent: Nov. 5, 2019

(54) DEVICES FOR PRESENTING VIDEO PROGRAM SEGMENTS IN ACCORDANCE WITH DEFINITION DOCUMENTS

(71) Applicant: The DIRECTV Group, Inc., El Segundo, CA (US)

(72) Inventors: Kenneth Lee, Rancho Palos Verdes, CA (US); Brady Court Tsurutani, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/376,522

(22) Filed: Dec. 12, 2016

(65) Prior Publication Data

US 2018/0167648 A1   Jun. 14, 2018

(51) Int. Cl.
*H04N 7/173* (2011.01)
*H04N 21/235* (2011.01)
*H04N 21/84* (2011.01)
*H04N 21/845* (2011.01)
*G11B 27/00* (2006.01)
*H04N 21/472* (2011.01)
*H04N 21/234* (2011.01)
*H04N 21/233* (2011.01)

(52) U.S. Cl.
CPC .......... *H04N 21/235* (2013.01); *G11B 27/00* (2013.01); *H04N 21/47205* (2013.01); *H04N 21/84* (2013.01); *H04N 21/845* (2013.01); *H04N 21/233* (2013.01); *H04N 21/234* (2013.01)

(58) Field of Classification Search
CPC .... H04N 21/235; H04N 21/234; H04N 21/84; H04N 21/43; H04N 21/4828; H04N 21/439
USPC ........................................ 725/9, 46, 47, 116
See application file for complete search history.

(56) References Cited

U.S. PATENT DOCUMENTS

| | | |
|---|---|---|
| 8,112,504 B2 | 2/2012 | Logan et al. |
| 8,977,106 B2 | 3/2015 | Casagrande |
| 9,138,652 B1 * | 9/2015 | Thompson ......... H04N 21/2358 |
| 9,277,251 B2 | 3/2016 | Kummer et al. |
| 9,351,023 B2 | 5/2016 | Kummer et al. |
| 9,392,228 B2 | 7/2016 | Kandekar et al. |
| 9,451,202 B2 | 9/2016 | Beals |
| 2005/0022246 A1 | 1/2005 | Kung |
| 2008/0112690 A1 | 5/2008 | Shahraray et al. |
| 2009/0232481 A1 | 9/2009 | Baalbergen et al. |
| 2012/0148216 A1 | 6/2012 | Pavagada et al. |

(Continued)

*Primary Examiner* — Jivka A Rabovianski

(57) ABSTRACT

Devices, computer-readable media, and methods for presenting segments of at least one video program in accordance with a definition document are disclosed. For example, a processor may load a definition document for at least one video program. The definition document may specify segments of the at least one video program for presentation and further specify segment types for the segments. The segment types may identify whether a segment is to include video content, include audio content, or include both video and audio content. The processor may further obtain the at least one video program, present a first segment of the at least one video program in accordance with the definition document, and present a second segment of the plurality of segments of the at least one video program in accordance with the definition document.

19 Claims, 6 Drawing Sheets

(56) References Cited

U.S. PATENT DOCUMENTS

| | | | |
|---|---|---|---|
| 2014/0349750 A1* | 11/2014 | Thompson | A63F 13/12 |
| | | | 463/31 |
| 2015/0350735 A1 | 12/2015 | Köser | |
| 2016/0037217 A1* | 2/2016 | Harmon | H04N 21/45457 |
| | | | 725/9 |
| 2016/0066007 A1 | 3/2016 | Zhang | |

* cited by examiner

DEVICES FOR PRESENTING VIDEO PROGRAM SEGMENTS IN ACCORDANCE WITH DEFINITION DOCUMENTS

The present disclosure relates generally to the presentation of video programs, and more particularly to devices, non-transitory computer-readable media, and methods for presenting segments of at least one video program in accordance with a definition document and for creating a definition document for at least one video program.

BACKGROUND

Television service providers offer a number of options to subscribers for obtaining and presenting video programs. For example, a subscriber may view video programs that are provided by various content sources and broadcast by a television service provider. In addition, a subscriber may stream or download a video program in connection with a video on demand (VOD) service of the television service provider to a set top box for presentation on a television, or to a second screen, e.g., another subscriber device, such as a personal computer, a smart phone, a computing tablet, and so forth. A subscriber may also stream or download video programs from another entity, e.g., an over the top (OTT) provider, a video hosting web server, and so forth. In addition, a subscriber may record video programs to a digital video recorder (DVR) or to another subscriber device, where the video programs may be broadcast by the television service provider, or which may be purchased, rented, or rights otherwise obtained by the subscriber. The subscriber may then play back the recorded video programs at the subscriber's convenience.

SUMMARY

In one example, the present disclosure describes a device, computer-readable medium and method for presenting segments of at least one video program in accordance with a definition document. For instance, in one example, a processor may load a definition document for the at least one video program. The definition document may specify segments of the at least one video program for presentation and further specify segment types for the segments. The segment types may identify whether a segment is to include video content, include audio content, or include both video and audio content. The processor may further obtain the at least one video program, present a first segment of the at least one video program in accordance with the definition document, and present a second segment of the at least one video program in accordance with the definition document.

In another example, the present disclosure describes a device, computer-readable medium and method for creating a definition document for at least one video program. For instance, in one example, a processor may present an editor interface to create the definition document for the at least one video program and present the at least one video program via the editor interface. The processor may further receive a first plurality of inputs in accordance with the editor interface to select start and end points of a plurality of segments of the at least one video program and receive a second plurality of inputs in accordance with the editor interface to define segment types for the plurality of segments. In one example, the segment types identify whether a segment of the plurality of segments is to include video content, include audio content, or include both video and audio content. The processor may then create entries in the definition document for the plurality of segments, where an entry for a segment includes a start point, an end point, and a segment type for the segment.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various options are available for a user to playback digital video programs. This includes video programs stored on a physical medium or streamed over one or more networks to set-top boxes, mobile devices, and so forth. In one example, the present disclosure provides for the creation of a definition document that identifies specific segments of one or more video programs to be played back, while omitting other portions of the one or more video programs that are not included in the definition document. Segment types may also be defined to include both video and audio, just video (with muted audio), or just audio (with video suppressed). The definition document may include a segment record for each segment to include in the playback, where the segment record may include fields and entries within the fields for: a program/resource identifier (ID), a segment type, a time stamp, and a duration. The original video program, or video programs, are not altered. The device playing back the one or more video programs in accordance with the definition document skips over portions of the one or more video programs that are not included. In other words, the playback device skips from one segment to the next for segment records that are included in the definition document. In one example, the present disclosure provides an editor interface to create the definition document. A user may interact with one or more video programs to define start and end points for various segments, and to identify segments types for the segments that are defined. In one example, the definition document may be stored with device providing the editor interface, at another device within a local network, or in a remote host and downloaded to the playback device prior to presenting the one or more video programs in accordance with the definition document. These and other aspects of the present disclosure are described in greater detail below in connection with the examples of FIGS. 1-6.

Figure 1:
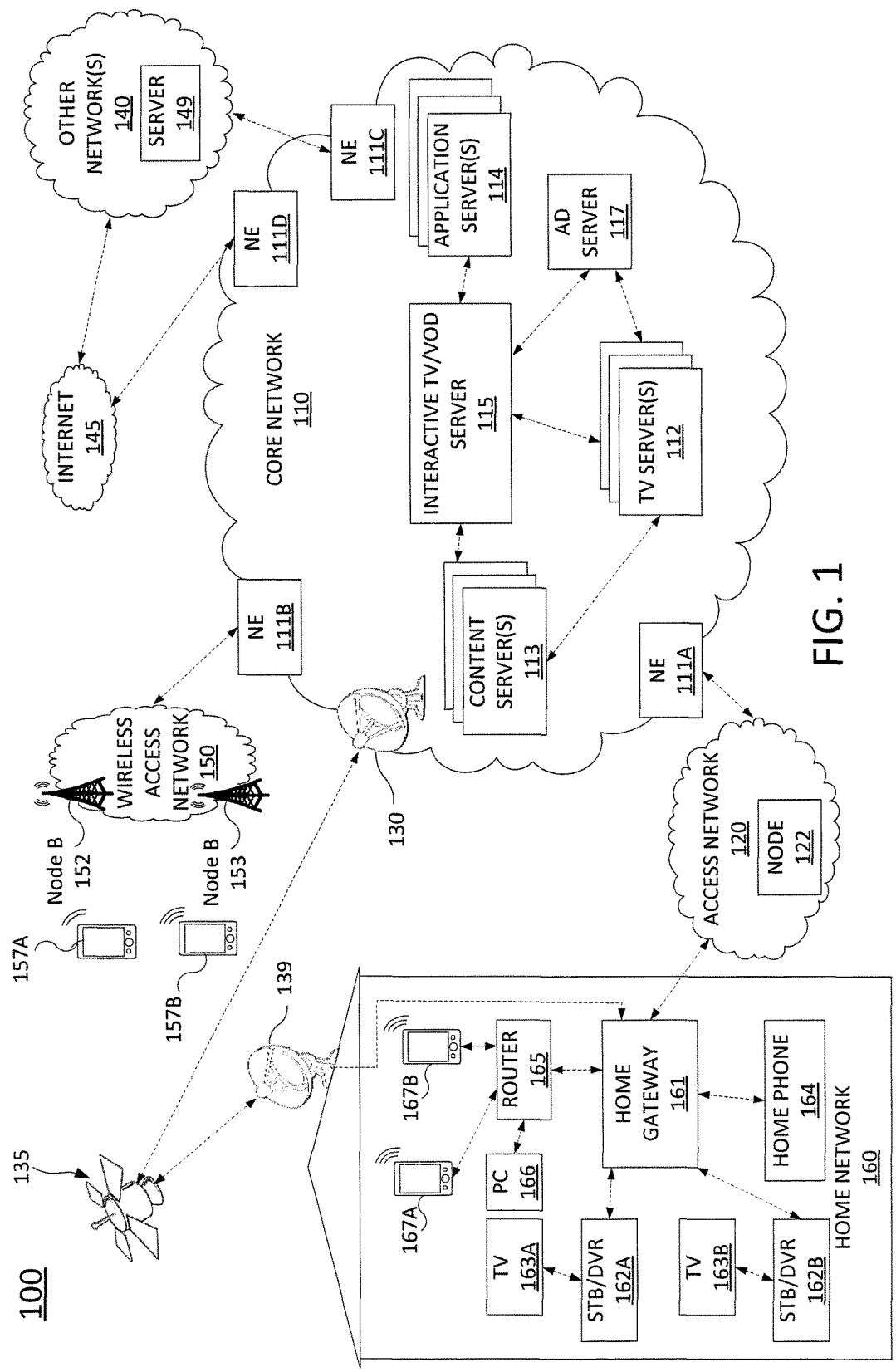
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145.

In one embodiment, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative embodiment, wireless access network 150 is shown as a UMTS terrestrial radio access network (UTRAN) subsystem. Thus, elements 152 and 153 may each comprise a Node B or evolved Node B (eNodeB).

In one embodiment, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one embodiment, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple-play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an interactive TV/VOD server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and interactive TV/VOD server 115 to select which video programs, or other content and advertisements to provide to the home network 160 and to others. Example functions of interactive TV/VOD server 115 are described in greater detail below.

In one example, content servers 113 may store scheduled television broadcast content for a number of television channels, video-on-demand programming, local programming content, and so forth. For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another embodiment node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving—Call Session Control Function (S-CSCF), a Proxy—Call Session Control Function (P-CSCF), or an Interrogating—Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. Application servers 114 may further include business information database (BID) storage servers. For instance, the network operator of core network 110 may receive and store third-party information relating to subscribers.

In one example, application servers 114 may include data storage servers to receive and store definition documents regarding the media programs (e.g., movies, television programming, and other content) maintained within content servers 113 and/or other media content. For example, the definition documents may be generated by subscribers associated with core network 110, e.g., a user associated with home network 160, and others. In one example, application servers 114 may represent a distributed file system, e.g., a Hadoop® Distributed File System (HDFS™), or the like. It should be noted that the foregoing are only several examples of the types of relevant application servers 114 that may be included in core network 110 for storing information relevant to providing personalized content to a subscriber.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

Figure 6:
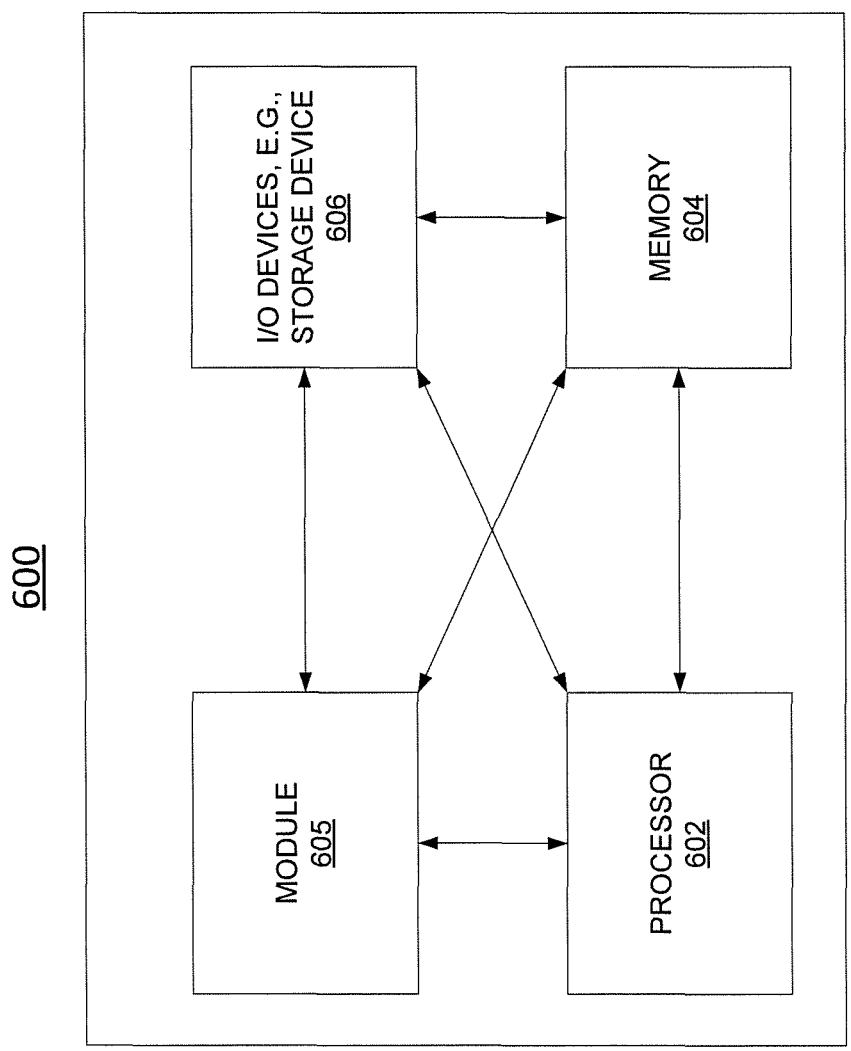
FIG. 6 illustrates a high level block diagram of a computing device specifically programmed to perform the steps, functions, blocks and/or operations described herein.

In one example, one or both of the STB/DVR 162A and STB/DVR 162B may comprise a computing system or server, such as computing system 600 depicted in FIG. 6, and may be configured to provide one or more operations or functions for presenting segments of at least one video program in accordance with a definition document and/or for creating a definition document for at least one video program, as described herein. It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

In one example, the user interface may comprise a plurality of screens which may be navigated by making various selections via inputs from a remote control or other control device. For instance, one or more screens may provide a programming guide that lists channels and the programming that is playing or is scheduled to play on such channels. Channels and/or video programs listed in the programming guide may be selected to provide more detailed information regarding the channel and/or the program(s), such as cast and crew information, original air date information, rating information, upcoming show times, e.g., for repeat broadcasts of the same video program, and so forth. Another screen may provide a menu of available selections for video-on-demand content, such as listings by content provider/television channel, by category or content type, and so forth. Another screen may provide a listing of available video content that is stored in the STB/DVR 162A and/or STB/DVR 162B. Another screen may provide a menu of options for recording video content to the STB/DVR 162A and/or STB/DVR 162B, and so on. In one example, STB/DVR 162A and/or STB/DVR 162B may also provide a web browser for obtaining video programs from servers hosting such video programs, and for making such video programs available via the Internet 145. For instance, in one example, server 149 in other networks 140 may represent such a web server. In one example, the web browser may comprise a limited web browser that is restricted to accessing certain approved web sites providing video programs.

Figure 2:
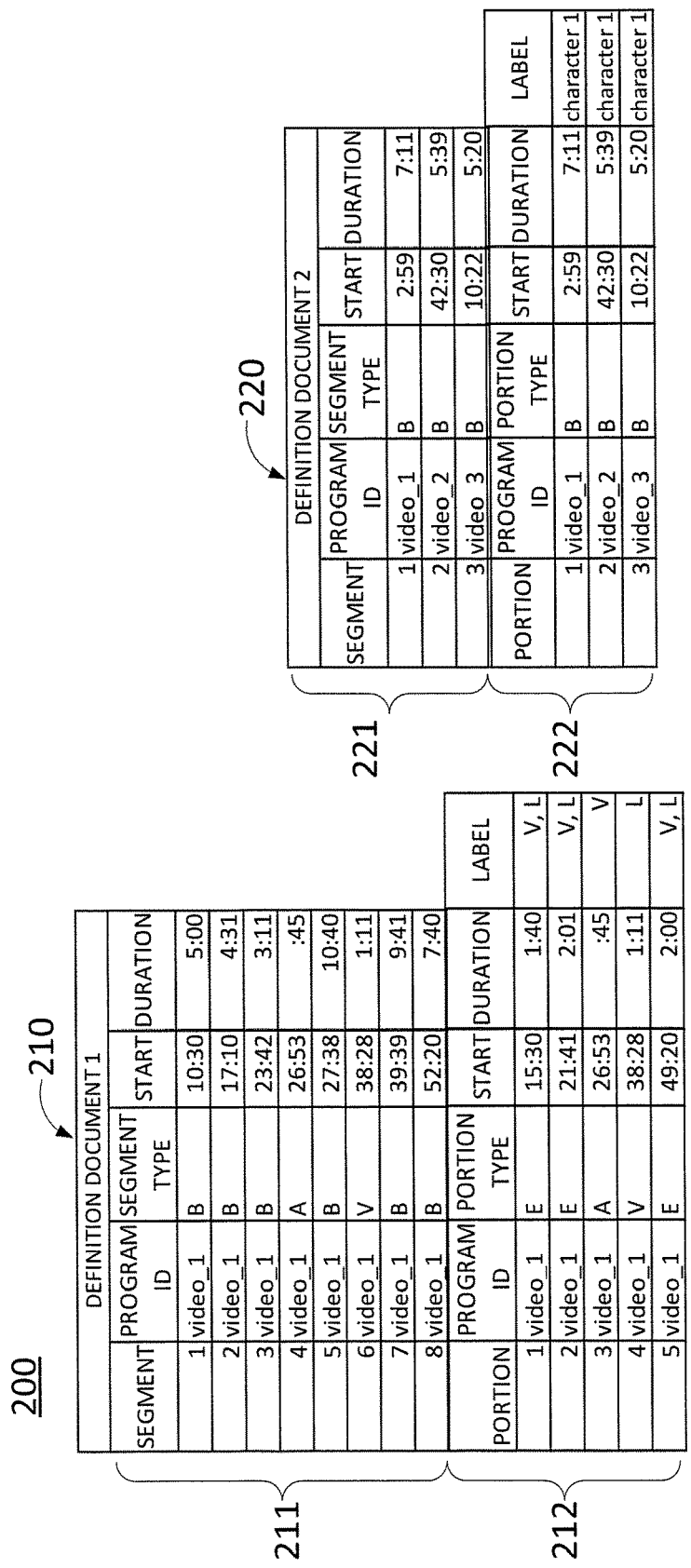
FIG. 2 illustrates an example set of definition documents in accordance with the present disclosure.
Figure 3:
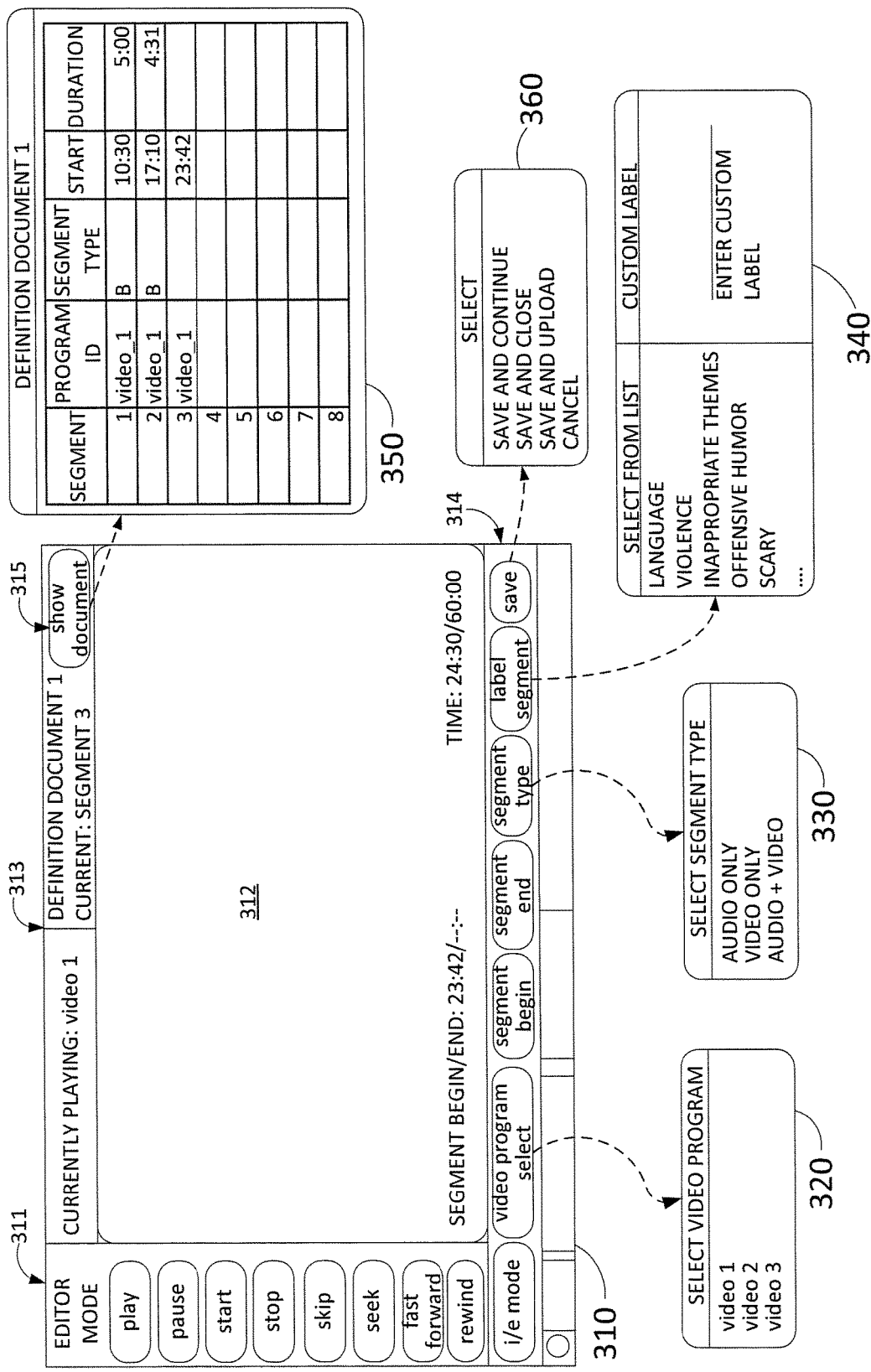
FIG. 3 illustrates an example editor interface for creating a definition document.
Figure 4:
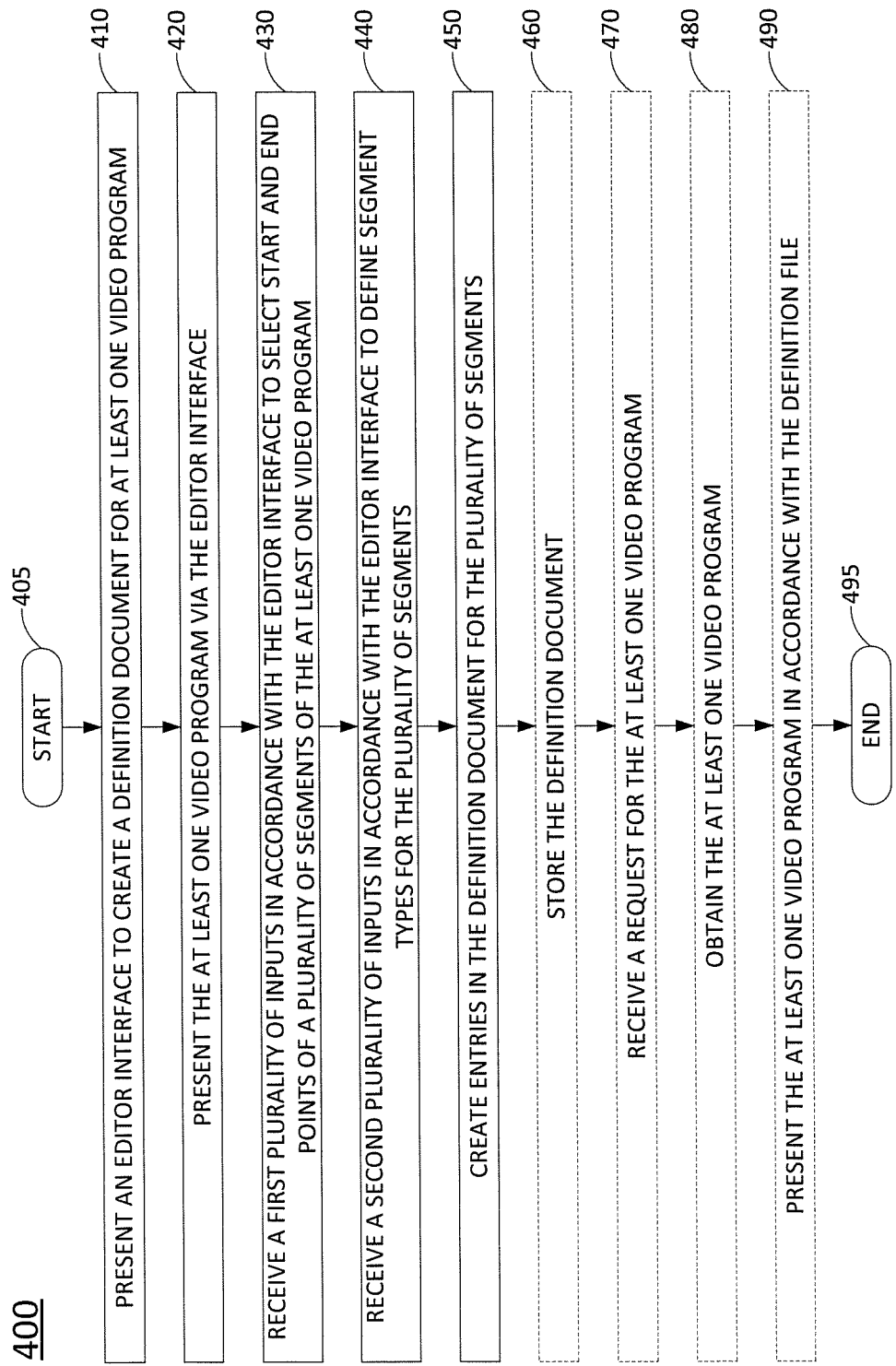
FIG. 4 illustrates a flowchart of an example method for creating a definition document for at least one video program.

In one example, the user interface may provide an editor mode (or "editor interface") where a user may present one or more video programs on TV 163A or TV 163B, and may create a definition document by inputting commands via the remote control or other control device to define segments within the one or more video programs, to assign segment types to the segments, to label the segments, and so forth. In one example, the video programs that may be presented in editor mode include live video programs/broadcast programs, video-on-demand programs, and video programs stored on STB/DVR 162A and/or STB/DVR 162B (e.g., DVR video content). In one example, a user interface may further provide an option to upload a definition document to store in the core network 110, e.g., in one of application servers 114 and/or in a third party server, e.g., server 149 in other networks 140. For example, server 149 in one of the other networks 140 may comprise a server of a social networking service, or a web server hosting a website for uploading, storing, and sharing definition documents. Example definition documents are illustrated in FIG. 2. An example of a user interface in editor mode (e.g., an "editor interface") is illustrated in FIG. 3. A flowchart of an example method for creating a definition document is illustrated in FIG. 4.

Figure 5:
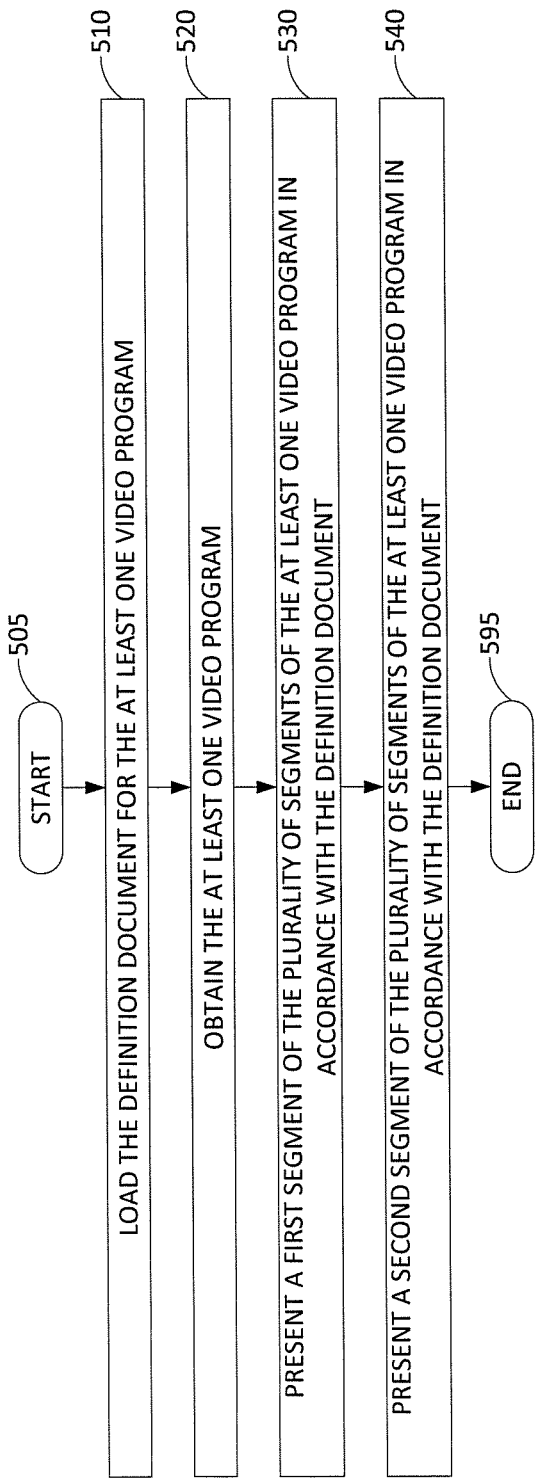
FIG. 5 illustrates a flowchart of an example method for presenting segments of at least one video program in accordance with a definition document.

In one example, a user interface may also provide an option to select and to present one or more video programs in accordance with a definition document. In one example, the definition document may be stored locally at one or both of STB/DVR 162A and/or STB/DVR 162B. In another example, the user interface may provide an option to access a repository of definition documents, e.g., in one of application servers 114 and/or in a third party server, e.g., server 149 in other networks 140, and to select a definition document for use in presenting the one or more video programs. STB/DVR 162A and/or STB/DVR 162B may present the one or more video programs in accordance with a definition document that is selected. A flowchart of an example method of presenting segments of at least one video program in accordance with a definition document is illustrated in FIG. 5 and described in greater detail below.

It should be noted that in one example, another device may provide one or more operations or functions for presenting segments of at least one video program in accordance with a definition document and/or for creating a definition document for at least one video program, as described herein. For instance, one or more of mobile devices 157A, 157B, 167A and 167B, and/or PC 166 may also comprise a computing system, such as computing system 600 depicted in FIG. 6, and may be configured to provide one or more operations or functions for presenting segments of at least one video program in accordance with a definition document and/or for creating a definition document for at least one video program, as described herein. For instance, mobile devices 157A, 157B, 167A and 167B, and/or PC 166 may present video programs that are stored locally (e.g., on the respective mobile device, or video programs that are stored within a same local network to which the mobile device is connected, e.g., DVR video programs from STB/DVR 162A and/or STB/DVR 162B), or which may be received via a network, e.g., VOD programs, web based video programs, e.g., Moving Picture Expert Group (MPEG) .mpeg files, .mov files, .mp4 files, or the like, IPTV video programs, and so forth. In one example, mobile devices 157A, 157B, 167A and 167B, and/or PC 166 may present video programs in an editor mode or may present video programs in accordance with definition files which may be created on the respective mobile devices, or which may be obtained from another device, such as STB/DVR 162A and/or STB/DVR 162B, one of application servers 114, and/or server 149.

As illustrated in FIG. 1, core network 110 also includes an interactive TV/video on demand (VOD) server 115. In one example, the interactive TV/VOD server 115 may comprise a computing system or server, such as computing system 600 depicted in FIG. 6, and may be configured to provide one or more operations or functions for presenting segments of at least one video program in accordance with a definition document and/or for creating a definition document for at least one video program, as described herein. Among other things, interactive TV/VOD server 115 may function a server for STB/DVR 162A and/or STB/DVR 162B, one or more of mobile devices 157A, 157B, 167A and 167B, and/or PC 166 operating as a client for presenting segments of at least one video program in accordance with a definition document and/or for creating a definition document for at least one video program, as described herein. For example, STB/DVR 162A may present a user interface and receive inputs for creating a definition document in a similar manner as described above. However, STB/DVR 162A may forward the inputs to interactive TV/VOD server 115, where interactive TV/VOD server 115 may create the entries for various segments within the definition document, save and store the definition document, e.g., to one or more of application servers 114 functioning as data storage devices, and so forth. In addition, in one example, interactive TV/VOD server 115 may present one or more video programs in accordance with a definition document. For example, STB/DVR 162A may present a user interface and receive an input to present one or more video programs in accordance with a definition document. For instance, STB/DVR 162A may receive an input to provide a listing of available definition documents. STB/DVR 162A may request the listing from interactive TV/VOD server 115, which may retrieve the listing from one or more of application servers 114 and provide the listing to STB/DVR 162A. STB/DVR 162A may then present the listing, e.g., via TV 163A, and receive a further input selecting one of the definition documents. The STB/DVR 162A may relate the selection to interactive TV/VOD server 115 which may then obtain the video program(s) identified in the document, or segments thereof, e.g., from one of the content servers 113, and stream the video program(s) or segments thereof to STB/DVR 162A in accordance with the definition document. For example, interactive TV/VOD server 115 may stream content from a first segment, may perform a skip or seek operating to reach content at the start of a second segment, stream the content from the second segment, perform a skip or seek operating to reach content at the start of a next segment, stream the content from the next segment, and so forth.

In one example, interactive TV/VOD server 115 may also suppress video or audio for the segments that are streamed, e.g., depending upon the segment type according to the definition file. In another example, interactive TV/VOD server 115 may still provide both audio and video, but may alter or obscure either the video or audio, depending upon the segment type. For instance, the picture quality of the video may be degraded to the point where details are not visible, a portion of the frame(s) of the video may be blacked out, the audio may be scrambled or altered such that words and sentences are not discernable, the audio level may be reduced to a nearly inaudible level, and so forth. In another example, the definition document may be provided to or otherwise obtained by the STB/DVR 162A. The STB/DVR 162A may download or stream the entirety of the one or more video programs identified in the definition document from interactive TV/VOD server 115 and may then perform operations to present a segment, skip or seek to a start of a next segment, and so forth. It should be noted that interactive TV/VOD server 115 may perform further operations as a server with respect to STB/DVR 162B, mobile devices 157A, 157B, 167A and 167B, and/or PC 166.

Further details regarding the functions that may be implemented by interactive TV/VOD server 115, STBs/DVRs 162A and 162B, mobile devices 157A, 157B, 167A and 167B, and/or PC 166 are discussed in greater detail below in connection with the examples of FIGS. 2-5. In addition, those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

FIG. 2 illustrates an example set 200 comprising a first definition document 210 and a second definition document 220. As illustrated in FIG. 2, the first definition document 210 includes a first section 211 and a second section 212. The first section 211 may include a number of segment records, e.g., rows, for a number of segments. In the first definition document 210, each segment record includes fields for a segment number, a program identifier (ID), a segment type, a start time, and a duration. In the example of the first definition document 210, all of the eight segments record in the first section 211 are associated with the same video program, "video_1." It should be noted that the program ID may take various forms depending upon where the video program is stored, the original creator or distributor of the video program, and so forth. For instance, the program ID may include a uniform resource locator (URL) that may identify the actual video program, as well as identify a network location from which the video program may be obtained. In one example, the segment type field for each of the segment records may include an entry of "A," "V," or "B," representing audio, video, or both. For instance, the segment record for segment 1 includes a "B" in the segment type field. Therefore, when presenting via a display device, both the audio and video portions of the segment should be played. However, the segment record for segment 4 includes an "A" in the segment type field. Therefore, when presenting via a display device, the audio associated with the segment should be played. The video should be suppressed. For instance, the video portion may have violence that a user creating the definition document 210 may deem objectionable for certain viewers. However, the audio may be deemed important for the overall continuity and understanding of the video program. Accordingly, the audio may continue to be played for the segment during a playback in accordance with the first definition document 210. Similarly, the segment record for segment 6 includes a "V" in the segment type fields. Therefore, when presenting via a display device, the video should be displayed while the audio should be suppressed.

It should be noted that some segments may be non-contiguous in time. For instance, there is a 1 minute and 40 second gap between the end of the segment 1 at 15:30 (15 minutes and 30 seconds) and the beginning of the segment 2 at 17:10. However, other segments may be contiguous, but may comprise different segment types. For instance, segment 4 (audio only) ends at 27:38, where segment 5 (both audio and video) begins. Similarly, segment 5 ends at 38:28, where segment 6 (video only) begins.

In one example, the definition document 210 may further include a second section 212 in which the user creating the definition document 210 may tag video portions with different labels. In one example, the second section 212 may be considered an optional part of the definition document 210. A label may be used as a reminder to the user creating a definition document, or to other users who may utilize the definition document of the purpose of the inclusion of various segments, or the exclusion of various portions/sections of a video program. In this regard, it should be noted that the portion records identified in the second section 212 are more expansive that the segment records in the first section 211, and may include portions that constitute all or part of one or more included segments as well as portions that are entirely excluded. However, it should be noted that the tagging of portions with labels may be entirely optional at the discretion of a user. Portions which are not tagged with a label need not be provided with a corresponding portion record in a definition document.

Notably, portions that are excluded may be implicitly or explicitly excluded by the user. For instance, the user may include various segments, e.g., as per the first section 211, where portions of the video program that are not part of an included segment may constitute an excluded portion. In another example, a user may explicitly indicate excluded portions via an editor interface. To illustrate, the second section 212 includes portions 2, 4 and 10 which do not correspond to any of the segments included in the first section 211.

At least some of the portions defined in the second section 212 may, but need not correspond to the segments defined in the first portion 211. For instance, the segment records for segment 4 and segment 6 may correspond to the portions 3 and 4, respectively, in the second section 212. As shown in FIG. 2, the portions 3 and 4 include the labels "V" and "L," which may signify "violence" and "language" respectively. In one example, an editor interface may suggest or may prepopulate the second section 212 with portions that correspond to included segments and/or excluded portions. In this regard, the second section 212 may also include a column within each portion record for a "portion type". The portion types may include the same categories as the segment types included in the first section 211, but may also include an additional type of "exclude", indicated by the entry "E". In one example, if start and duration entries are pre-populated in the portion records in the second section 212, these entries may be subsequently changed by the user. Alternatively, or in addition, the user may generate entirely new or different portions, with start times and durations which may not correspond to any segment included in the first section 211, and which may even overlap with one another. Furthermore, a portion may be tagged with more than one label, such as portions 2, 4, and 10, which are excluded segments are which are tagged with both "V" and "L", signifying "language" and "violence." In one example, definition document 210 may also be searchable by label, e.g., to find portions (and/or segments) relating to the label.

The set 200 of FIG. 2 illustrates an additional example of a second definition document 220. The second definition document 220 is similar to the first definition document 210 insofar as both include segment records for a plurality of segments with fields for a segment number, a program identifier (ID), a segment type, a start time, and a duration. However, the second definition document 220 illustrates that a definition document may define segments that are taken from different video programs. For instance, segment 1 of the first portion 221 of the second definition document 220 is taken from "video_1," while segments 2 and 3 are taken from "video_2" and "video_3," respectively. For example, a user creating the second definition document 220 may want to splice segments highlighting certain sports plays of a particular player, or similar plays from different players, a series of sketches from a particular comedian or talks show host, and so forth.

Similar to the first definition document 210, the second definition document 220 may also optionally include a second section 222. As illustrated in FIG. 2, the entries in the label field for all three of the portion records in the second section 222 have been labeled "character 1." For example, the second definition document 220 may splice segments from three different video programs which include scenes involving "character 1." It should be noted that the second section 222 includes portion records for portions corresponding to included segments 1, 2, and 3, and does not include portion records for any excluded portions of video_1, video_2, and video_3.

It should be noted that the example first definition document 210 and second definition document 220 illustrate one of several possible formats for a definition document, and for segment records and portion records within a definition document. For instance, segment records may be used to identify both segments to include and segments to exclude. In still another example, the options for segment types may be expanded to include options to alter or obscure video, audio, both. For instance, the segment type of "B" may signify presenting unaltered audio and video, while "FV" may signify "filtered V" where the video content of the segment is to be obscured/altered by passing the video content through a scrambling filter. In one example, the first definition document 210 and/or second definition document 220 may represent a definition document in a format that is used for presentation to a user, e.g., via an editor interface. However, the first definition document 210 and/or second definition document 220 may be stored as an Extensible Markup Language (XML) document or the like with objects, e.g., Java Script Object Notation (JSON) objects, storing segment records. The definition document may then be converted into a form as illustrated in the first definition document 210 and/or second definition document 220 of FIG. 2 for presentation to a user. Thus, these and other modifications may be implemented in additional examples of the present disclosure.

To further aid in understanding the present disclosure, FIG. 3 illustrates example screen displays of a user interface 300 in an editor mode (or an "editor interface") for creating and editing a definition document. Display screen 310 of the user interface 300 includes a plurality of general playback buttons 311, which includes buttons for play, pause, start, stop, skip, seek, fast forward, and rewind. In one example, the user interface 300 may be presented via a touchscreen device, e.g., a smartphone, a tablet computer, or similar type of mobile device. Thus, a button may be selected by a user touching a portion of a touchscreen corresponding to the button. In another example, the user interface 300 may be presented by a set-top box via a television, by a smart TV, or by a laptop or personal computer, a gaming console, and so forth. In such examples, a button may be selected by using arrow keys on a remote control, keyboard, gaming controller, etc. (broadly a "control device") to jump from button to button. For instance, a current button may be highlighted or otherwise marked as compared to other buttons. The current button may be selected by pressing an "enter" or a "select" key on the control device. Alternatively, or in addition, the control device may be used to move a cursor (not shown in FIG. 3) to hover over a button. The button may then be selected by pressing an "enter" or a "select" key on the control device. In still another example, a set-top box, smart TV, touchscreen device, laptop or personal computer, gaming console, and so forth may present the user interface 300 in connection with a client-server interaction with a television service provider network based server, e.g., an interactive TV/VOD server. However, the manner of selecting various buttons may be the same as in the preceding examples.

Display screen 310 also includes a playback/viewing area 312 which may provide a running time of the current video program being displayed in the playback/viewing area 312 and begin and end times for the current segment. An information bar 313 may include an identification of the video program currently being displayed, e.g., "video 1," a current segment, e.g., segment "3," and an identification of the definition document being created/edited, e.g., "definition document 1." In one example, "definition document 1" may correspond to the first definition document 210 in FIG. 2. For instance, display screen 310 may illustrate a point in time during which segment "3" is being created. The segment begins at time 23:43 within "video 1." The end of the segment has not yet been set. It should be noted that for ease of illustration, an optional section with portion records is not shown in "definition document 1" in window 350. (Example portion records are illustrated in the second section 212 in the example of first definition document 210 in FIG. 2).

In one example, the user interface 300 also presents via the display screen 310 a show document button 315. In one example, a selection of the show document button 315 may cause the display of window 350 which may occupy all or a portion of the display screen 310 and/or overlay other visual content on the display screen 310, such as playback/viewing area 312. For instance, the "definition document 1" may be displayed in window 350 in response to a selection of the show document button 350 at the point of the playback of "video 1" illustrated in the playback/viewing area 312. In particular, a segment record (a row in definition document 1) for segment "3" is in the process of being created. The begin time for segment "3" is already set at 23:42, the playback/viewing area 312 is showing the content at time 24:30 of "video 1," and the end time for segment "3" is not yet set. In one example, the opening of the window 250 may cause the playback of the currently playing video program to be stopped or pause.

In one example, the user interface 300 presents via the display screen 310 a plurality of editor buttons 314 which may include a "video program select" button, a "segment begin" button, a "segment end" button, a "segment type" button, a "label segment" button, and a "save" button. A selection of the "video program select" button may open a window 320 for selecting a video program. A selection of the "segment begin" button may mark the beginning of a new segment. For instance, the "segment begin" button may have been selected at a time 23:42 within "video 1." Thus, playback/viewing area 312 indicates the begin time for segment 3 is 23:42. A selection of the "segment end" button may mark the end of a segment. For instance, the end time for segment "3" may be fixed when the "segment end" button is next selected. A selection of the "segment type" button may open a window 330 for choosing a segment type, e.g., audio only "A," video only "V," and both audio and video "B." A selection of the "label segment" button, may open a window 340 which offers a list of possible segment labels, or provides for a user to enter a custom label. A selection of the "save" button may open a window 360 with several options for saving the definition document currently being created/edited.

In one example, the editor buttons 314 further include an "i/e mode" button, for selecting either an "inclusionary" or an "exclusionary" mode for the user interface 310. For example, in "inclusionary" mode, the selection of "segment begin" and "segment end" buttons may define segments to be included in a presentation of video programming in accordance with a definition document. However, in "exclusionary" mode, the "segment begin" and "segment end" buttons may be changed to "portion begin" and "portion end" buttons respectively. Selection of "portion begin" and "portion end" buttons may define logically excluded portions, while a definition document will store included portions (i.e., segments) that are determined from portions of the video program other than the logically excluded portions. To illustrate, if a user selects "portion begin" and "portion end" buttons at 5:00 and 10:00 of a video program, the corresponding definition document may include segment records for a first segment from 0:00 to 5:00, and a second segment from 10:00 to the end.

It should be noted that the user interface 300 is just one example of a user interface that may be provided for creating and editing definition documents. For instance, in another example a single button for "segment begin" and "segment end" may be provided where the button may first be selected to start a new segment, and where a subsequent selection of the button may mark the end of the segment. Alternatively, or in addition, after a selection of the "segment begin" button, a subsequent selection of the "segment begin" button may mark the end of a segment, and may also mark the beginning of a new segment. In still another example, the "segment type" button may be expanded to comprise separate buttons for each of the segment types. In still another example, the buttons may be expanded to accommodate additional segment types with altered or obscured video, audio, both. In such an example, the window 330 may be omitted. Thus, these and other modifications may be implemented in additional examples of the present disclosure.

FIG. 4 illustrates a flowchart of a method 400 for creating a definition document for at least one video program, in accordance with the present disclosure. In one example, the method 400 is performed by the interactive TV/VOD server 115 of FIG. 1, any one or more components thereof (e.g., a processor performing operations stored in and loaded from a memory), or by the interactive TV/VOD server 115 in conjunction with one or more other devices, such as application servers 114 functioning as data storage devices, STB/DVR 162A or STB/DVR 162B, TVs 163A and 163B, and so forth. In still another example, the method 400 may be performed by STB/DVR 162A, STB/DVR 162B, one of the TVs 163A and 163B, PC 166, one of the mobile devices 157A, 157B, 167A, or 167B, and so forth. In one example, the steps, functions, or operations of method 400 may be performed by a computing device or system 600, and/or processor 602 as described in connection with FIG. 6 below. For instance, the computing device or system 600 may represent any one or more components of FIG. 1 that are configured to perform the steps, functions and/or operations of the method 400. For illustrative purposes, the method 400 is described in greater detail below in connection with an example performed by a processor, such as processor 602. The method 400 begins in step 405 and proceeds to step 410.

At step 410, the processor presents an editor interface to create a definition document for at least one video program. For example, the editor interface may comprise a user interface for an editor mode as illustrated in FIG. 3.

At step 420, the processor presents the at least one video program via the editor interface. For instance, one or more video programs may be presented within a playback/viewing area of the editor interface. A first video program may be selected to work with. Optionally, one or more additional video programs may also be selected to work with. In particular, a definition document may be created to include segment records for segments from one video program, or from several different video programs.

At step 430, the processor receives a first plurality of inputs in accordance with the editor interface to select start and end points of a plurality of segments of the at least one video program. For instance, a video program may be presented and may be manipulated with general playback buttons of the editor interface, such as play, pause, rewind, fast forward, skip, etc. In addition, the editor interface may also provide buttons to select start and end times for a segment. Thus, for example, the first plurality of inputs may comprise selections for marking the start of a segment and the end of a segment.

At step 440, the processor receives a second plurality of inputs in accordance with the editor interface to define segment types for the plurality of segments. For example, the editor interface may provide one or more buttons to mark a segment type for a segment. In one example, the segment types identify whether a segment of the plurality of segments is to include video content and omit audio content (e.g., video only), include audio content and omit video content (e.g., audio only), or include both video and audio content. Alternatively, or in addition, the segment types may identify whether a segment is to be presented with altered or obscured video and/or audio. For instance, the options for available segment types may include an option for both (unaltered) video and (unaltered) audio, and options for altered or obscured video and/or audio. In one example, an option for unaltered video and unaltered audio, and options for altered or obscured video and/or audio may comprise sub-categories of a segment type for "both audio and video."

At step 450, the processor creates entries in the definition document for the plurality of segments, wherein an entry for a segment includes a start point, an end point, and a segment type for the segment. The entries may be included in segment records for each segment, e.g., as illustrated in the example definition documents of FIG. 2. In one example, the definition document may comprise an XML document, with objects defined for each of the segment records. In one example, the segment records may comprise JSON objects, or the like. Following step 450, the method 400 may proceed to optional step 460 or may proceed to step 495.

At optional step 460, the processor may store the definition document. For example, the definition document may be stored within a same device as the processor, or an attached storage device. In one example, the storing comprises uploading the definition document to a server of a social networking service provider or to a server of a television service provider network. In another example, the storing comprises uploading the definition document to a set-top box (STB). For instance, the processor may comprise a processor of a STB, a DVR, a STB/DVR combo, an interactive TV/VOD server, a mobile device, a PC or laptop computer, and so forth. Thus, the definition document may be stored locally (e.g., within a same device or within a same routing domain/local network) or remotely with respect to the device of the processor.

At optional step 470, the processor may receive a request for the at least one video program. For instance, a user interface presented on a TV via a set-top box, or by a smart TV or other playback device may provide an option to play the at least one video program in accordance with a definition document. Thus, in one example, a user may select to play the at least one video program, and may also select the definition document to use in rendering the playback. In one example, the selection of the definition document may implicitly comprise a selection of the at least one video program identified within the segment records of the definition document.

At optional step 480, the processor may obtain the at least one video program. For example, the at least one video program may be obtained from a storage device integrated with or attached to the device of the processor. For instance, the at least one video program may be stored in a STB, a DVR, a STB/DVR combo, a content server of a television service provider network, a mobile device, a PC or laptop computer, and so forth, where the processor is deployed within a same device, or an attached device. In another example, the at least one video program may be obtained from a different device. For instance, the processor may be deployed in a STB/DVR and may obtain the at least one video program from an interactive TV/VOD server. In another example, the processor may be deployed in a PC or smart TV and the at least one video program may be obtained from a web server. The obtaining may be include streaming the at least one video program, or download and storing the at least one video program. In one example, the at least one video program may comprise a plurality of video programs, which may be obtained from a same location, or which may be obtained from different locations. For instance, a first video program of the plurality of video programs may be stored locally with respect to the processor, while a second video program of the plurality of video programs may obtained from a remote device.

At optional step 490, the processor may present the at least one video program in accordance with the definition file. For instance, as mentioned above, the definition file may comprise an XML file or the like comprising JSON objects or similarly formatted objects, which may be compiled by the processor into a series of instructions in accordance with an API of the device of the processor. For instance, the XML file/JSON objects may be converted into a series of API commands which are then executed by the processor to cause the presentation of the at least on video program, such as "tune," e.g., to a particular television channel, "skip," e.g., to a particular time within the video program, "play," "mute," e.g., for segments with video only, "filter," e.g., for segments with obscured audio or video, and so forth. The at least one video program may be presented via an attached display and/or audio output unit (such as a speaker or headphone), e.g., for a laptop computer, tablet computer, PC, etc., or via an external and/or a remote display and/or audio output unit, such as an interactive TV/VOD server and/or STB/DVR presenting the at least one video program via a television. For instance, in an example where the processor comprises a processor of an interactive TV/VOD server, the processor may generate API commands based upon the XML file and transmit the commands to a STB/DVR to cause the STB/DVR present the one or more video programs in response to the commands. Following step 450 or optional step 490, the method 400 proceeds to step 495 where the method ends.

FIG. 5 illustrates a flowchart of a method 500 for presenting segments of at least one video program in accordance with a definition document, in accordance with the present disclosure. In one example, the method 500 is performed by the interactive TV/VOD server 115 of FIG. 1, any one or more components thereof (e.g., a processor performing operations stored in and loaded from a memory), or by the interactive TV/VOD server 115 in conjunction with one or more other devices, such as application servers 114 functioning as data storage devices, STB/DVR 162A or STB/DVR 162B, TVs 163A and 163B, and so forth. In still another example, the method 500 may be performed by STB/DVR 162A, STB/DVR 162B, or one of the TVs 163A and 163B. In one example, the steps, functions, or operations of method 500 may be performed by a computing device or system 600, and/or processor 602 as described in connection with FIG. 6 below. For instance, the computing device or system 600 may represent any one or more components of FIG. 1 that are configured to perform the steps, functions and/or operations of the method 500. For illustrative purposes, the method 500 is described in greater detail below in connection with an example performed by a processor, such as processor 602. The method 500 begins in step 505 and may proceeds to step 510.

At step 510, the processor loads a definition document for at least one video program. In one example, the definition document specifies a plurality of segments of the at least one video program for presentation. In one example, the definition document further specifies segment types for the plurality of segments, where the segment types identify whether a segment of the plurality of segments is to include video content and omit audio content, include audio content and omit video content, or include both video and audio content. In one example, the definition document may be created by the processor in accordance with the method 400 described above. In another example, the definition document may be obtained from an external and/or a remote device (with respect to a device of the processor) and may be loaded by the processor at step 510. For instance, the processor may obtain the definition document from a television service provider, or from a server of a social networking service provider.

At step 520, the processor obtains the at least one video program. For example, the at least one video program may be obtained from a storage device integrated with or attached to the device of the processor. In another example, the at least one video program may be obtained from a different device. In one example, the at least one video program may comprise a plurality of video programs, which may be obtained from a same location, or which may be obtained from different locations. In one example, step 520 may comprise the same or similar operations as optional step 480 of the method 400.

At step 530, the processor presents a first segment of the plurality of segments of the at least one video program in accordance with the definition document. For instance, as mentioned above, the definition file may comprise an XML file with a plurality of JSON objects which may be converted into a series of commands in accordance with an API of the device of the processor, which the processor may then execute to cause the presentation of the at least one video program. Thus, the first segment may be presented in response to the execution of one or more instructions as derived from the definition document. The first segment may be presented via an attached display and/or audio output unit, e.g., for a laptop computer, tablet computer, PC, etc., or via an external display and/or audio output unit, such as an interactive TV/VOD server and/or STB/DVR presenting the first segment via a television.

At step 540, the processor presents a second segment of the plurality of segments of the at least one video program in accordance with the definition document. The second segment may be presented via the same modality as the first segment is presented at step 530, e.g., via a laptop computer, a tablet computer, a PC display and/or a speaker, via a television screen, and so forth. In one example, steps 530 and 540 may comprise the same or similar operations as optional step 490 of the method 400. Following step 540, the method 500 proceeds to step 595 where the method ends.

In addition, although not expressly specified above, one or more steps of the method 400 or the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 or FIG. 5 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 6 depicts a high-level block diagram of a computing device specifically programmed to perform the functions described herein. For example, any one or more components or devices illustrated in FIG. 1 or described in connection with the method 400 or the method 500 may be implemented as the system 600. As depicted in FIG. 6, the system 600 comprises a hardware processor element 602 (e.g., a microprocessor, a central processing unit (CPU) and the like), a memory 604, (e.g., random access memory (RAM), read only memory (ROM), a disk drive, an optical drive, a magnetic drive, and/or a Universal Serial Bus (USB) drive), a module 605 for presenting segments of at least one video program in accordance with a definition document and/or for creating a definition document for at least one video program, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one embodiment, instructions and data for the present module or process 605 for presenting segments of at least one video program in accordance with a definition document and/or for creating a definition document for at least one video program (e.g., a software program comprising computer-executable instructions) can be loaded into memory 604 and executed by hardware processor element 602 to implement the steps, functions or operations as discussed above in connection with the example method 400 or the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for presenting segments of at least one video program in accordance with a definition document and/or for creating a definition document for at least one video program (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A device, comprising:
a processor; and
a computer-readable medium storing instructions which, when executed by the processor, cause the processor to perform operations, the operations comprising:
presenting an editor interface for a subscriber to create a definition document for at least one video program, the at least one video program having video content and audio content;
presenting the at least one video program via the editor interface;
preparing the definition document in accordance with a plurality of inputs of the subscriber to select start times, end times, and segment types of a plurality of segments of the at least one video program, wherein the definition document includes a segment record for each segment of the plurality of segments, each segment record comprising a start time, an end time, and a segment type, wherein the segment types are defined by the subscriber and are selectable by the subscriber to include a video segment type, an audio segment type, and a both audio and video segment type, wherein the audio segment type specifies that a video portion of the video content of a segment of the plurality of segments is to be presented with suppression, the video segment type specifies that an audio portion of the audio content of the segment of the plurality of segments is to be presented with suppression, and the both audio and video segment type specifies that the video portion of the video content and the audio portion of the audio content of the segment of the plurality of segments are both to be presented without suppression;

loading the definition document;

obtaining the at least one video program;

presenting a first segment of the plurality of segments of the at least one video program in accordance with the definition document, wherein the first segment is presented without suppression of a corresponding video portion of the first segment or a corresponding audio portion of the first segment; and presenting a second segment of the plurality of segments of the at least one video program in accordance with the definition document, wherein the second segment is presented with suppression of a corresponding video portion of the second segment or suppression of a corresponding audio portion of the second segment, wherein the device is a user device.

2. The device of claim 1, wherein the first segment and the second segment are non-contiguous within a timeline of a first video program of the at least one video program.

3. The device of claim 1, wherein the first segment and the second segment are contiguous within a timeline of a first video program of the at least one video program and comprise different segment types.

4. The device of claim 1, wherein for the presenting the first segment and the presenting the second segment, the definition document is obtained from a server that is external to a local network of the device.

5. The device of claim 4, wherein the server comprises a server of a social networking service provider.

6. The device of claim 4, wherein the server comprises a server of a television service provider network.

7. The device of claim 1, wherein for the presenting the first segment and the presenting the second segment, the definition document is obtained from a different device within a same local network as the device.

8. The device of claim 1, wherein a video program of the at least one video program is obtained from an attached storage.

9. The device of claim 1, wherein a video program of the at least one video program is obtained via a video stream from a head-end unit within a television service provider network.

10. The device of claim 1, wherein a video program of the at least one video program is obtained via a download from a server of a television service provider network.

11. The device of claim 1, wherein the definition document is generated in accordance with segment labels for the plurality of segments.

12. A non-transitory computer-readable medium storing a plurality of instructions which, when executed by a processor of a device, cause the processor to perform operations, the operations comprising:

presenting an editor interface for a subscriber to create a definition document for at least one video program, the at least one video program having video content and audio content;

presenting the at least one video program via the editor interface;

preparing the definition document in accordance with a plurality of inputs of the subscriber to select start times, end times, and segment types of a plurality of segments of the at least one video program, wherein the definition document includes a segment record for each seqment of the plurality of segments, each segment record comprising a start time, an end time, and a segment type, wherein the segment types are defined by the subscriber and are selectable by the subscriber to include a video segment type, an audio segment type, and a both audio and video seqment type, wherein the audio segment type specifies that a video portion of the video content of a segment of the plurality of segments is to be presented with suppression, the video segment type specifies that an audio portion of the audio content of the segment of the plurality of segments is to be presented with suppression, and the both audio and video segment type specifies that the video portion of the video content and the audio portion of the audio content of the segment of the plurality of segments are both to be presented without suppression, loading the definition document;

obtaining the at least one video program;

presenting a first segment of the plurality of segments of the at least one video program in accordance with the definition document, wherein the first segment is presented without suppression of a corresponding video portion of the first segment or a corresponding audio portion of the first segment; and presenting a second segment of the plurality of segments of the at least one video program in accordance with the definition document, wherein the second segment is presented with suppression of a corresponding video portion of the second segment or suppression of a corresponding audio portion of the second segment, wherein the device is a user device.

13. A device, comprising:

a processor; and a computer-readable medium storing instructions which, when executed by the processor, cause the processor to perform operations, the operations comprising:

presenting an editor interface that enables a subscriber to create a definition document for at least one video program, the at least one video program having video content and audio content;

presenting the at least one video program via the editor interface;

receiving a first plurality of inputs of the subscriber in accordance with the editor interface to select start times and end times of a plurality of segments of the at least one video program;

receiving a second plurality of inputs of the subscriber in accordance with the editor interface to define segment types for the plurality of segments, wherein the segment types include a video segment type, an audio segment type, and a both audio and video segment type, wherein the audio segment type specifies that a video portion of the video content of a segment of the plurality of segments is to be presented with suppression, the video segment type specifies that an audio portion of the audio content of the segment of the plurality of segments is to be presented with suppression, and the both audio and video segment type specifies that the video portion of the video content and the audio portion of the audio content of the segment of the plurality of segments are both to be presented without suppression; and creating segment records in the definition document for the plurality of segments, wherein a segment record of the segment records for a segment of the plurality of segments includes a start time, an end time, and a segment type for the segment, wherein the device is a user device;

wherein for a presentation of the at least one video program via the device in accordance with the definition document, a first segment of the plurality of segments of the at least one video program is presented without suppression of a corresponding video portion of the first segment or a corresponding audio portion of the first segment and a second segment of the plurality of segments of the at least one video program is presented with suppression of a corresponding video portion of the second segment or suppression of a corresponding audio portion of the second segment.

14. The device of claim 13, wherein the operations further comprise:

storing the definition document.

15. The device of claim 14, wherein the storing comprises:

uploading the definition document to a server of a social networking service provider or to a server of a television service provider network.

16. The device of claim 14, wherein the storing comprises:

uploading the definition document to a set-top box.

17. The device of claim 13, further comprising:

receiving a request for the at least one video program;

obtaining the at least one video program; and presenting the at least one video program in accordance with the definition document.

18. The device of claim 17, wherein the presenting the at least one video program in accordance with the definition document comprises:

presenting the first segment of the plurality of segments of the at least one video program in accordance with the definition document, wherein the first segment is presented without the suppression of the corresponding video portion of the first segment or the corresponding audio portion of the first segment; and presenting the second segment of the plurality of segments of the at least one video program in accordance with the definition document, wherein the second segment is presented with the suppression of the corresponding video portion of the second segment or the suppression of the corresponding audio portion of the second segment.

19. The device of claim 13, wherein the processor is deployed in a set-top box.

* * * * *